(12) United States Patent
Suetsugu et al.

(10) Patent No.: US 12,233,767 B2
(45) Date of Patent: Feb. 25, 2025

(54) SEAT PARTITION

(71) Applicant: TOYOTA BOSHOKU KABUSHIKI KAISHA, Aichi (JP)

(72) Inventors: Yuichi Suetsugu, Aichi (JP); Fumitoshi Akaike, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 101 days.

(21) Appl. No.: 17/986,554

(22) Filed: Nov. 14, 2022

(65) Prior Publication Data

US 2023/0158935 A1 May 25, 2023

(30) Foreign Application Priority Data

Nov. 19, 2021 (JP) ................................ 2021-188805

(51) Int. Cl.
*B60N 2/879* (2018.01)
*A47C 7/74* (2006.01)
*B60N 2/60* (2006.01)
*B60N 2/90* (2018.01)

(52) U.S. Cl.
CPC .............. *B60N 2/879* (2018.02); *A47C 7/742* (2013.01); *A47C 7/744* (2013.01); *B60N 2/6009* (2013.01); *B60N 2/91* (2018.02); *B60N 2002/905* (2018.02)

(58) Field of Classification Search
None
See application file for complete search history.

(56) References Cited

U.S. PATENT DOCUMENTS

| 11,364,822 | B1* | 6/2022 | Rajasingham | ....... B60N 2/2884 |
| 11,745,672 | B1* | 9/2023 | Tran | ..................... B60R 13/0823 |
| | | | | 296/24.46 |
| 2006/0175856 | A1* | 8/2006 | Colin | ...................... B60R 21/12 |
| | | | | 296/24.3 |
| 2007/0236061 | A1* | 10/2007 | Meeker | ................ B60N 2/2866 |
| | | | | 297/250.1 |
| 2014/0270322 | A1* | 9/2014 | Silverstein | ........... B60N 2/4214 |
| | | | | 381/391 |
| 2016/0280100 | A1* | 9/2016 | Scheppegrell | ....... B60N 2/2821 |
| 2018/0029544 | A1* | 2/2018 | Nania | ............... H01L 31/02167 |
| 2019/0061955 | A1* | 2/2019 | Wilson | ............... B64D 11/0646 |

(Continued)

FOREIGN PATENT DOCUMENTS

JP 2018-114183 7/2018
KR 20210116370 A * 9/2021
(Continued)

*Primary Examiner* — David E Allred
(74) *Attorney, Agent, or Firm* — GREENBLUM & BERNSTEIN, P.L.C.

(57) ABSTRACT

There is provided a seat partition capable of reducing deterioration of comfort with respect to rear seats. One aspect of the present disclosure is a seat partition that includes a plate-shaped panel configured to be mounted to a seat having a headrest. The panel includes: a main portion configured to cover at least a part of the headrest from a rear thereof; a side portion configured to cover at least a part of the headrest from a side thereof; a curved portion coupling the main portion and the side portion; and at least one ridge portion extending from the main portion through the curved portion to the side portion and projecting outward of the panel.

8 Claims, 4 Drawing Sheets

(56) References Cited

U.S. PATENT DOCUMENTS

| | | | | |
|---|---|---|---|---|
| 2019/0142172 A1* | 5/2019 | Toda | ................... | B60N 2/5607 |
| | | | | 297/180.13 |
| 2023/0099336 A1* | 3/2023 | Sekiguchi | ............. | G06F 1/1601 |
| | | | | 348/837 |
| 2023/0312095 A1* | 10/2023 | Escobar | ............. | B64D 11/0606 |
| | | | | 244/118.6 |

FOREIGN PATENT DOCUMENTS

| | | | | |
|---|---|---|---|---|
| KR | 20210116373 A | * | 9/2021 | |
| KR | 20210116374 A | * | 9/2021 | |
| KR | 20210116375 A | * | 9/2021 | |
| WO | WO-2016090423 A1 | * | 6/2016 | |

* cited by examiner

SEAT PARTITION

CROSS-REFERENCE TO RELATED APPLICATIONS

This application claims the benefit of Japanese Patent Application No. 2021-188805 filed on Nov. 19, 2021 with the Japan Patent Office, the entire disclosure of which is incorporated herein by reference.

BACKGROUND

The present disclosure relates to a seat partition.

There is a publicly known plate-shaped partition to separate adjacent seats (see Japanese Patent Application Publication No. 2018-114183). By arranging such a partition at a rear of a seat, it is possible, for example, to avoid scattering of droplets caused by an occupant of a rear seat.

SUMMARY

In case of providing a conventional partition at a rear of a seat, airflow is likely to be blocked by the partition. Thus, it is more likely that appropriate air conditioning is not provided to seats rearward of the seat provided with the partition, resulting in deterioration of comfort.

In one aspect of the present disclosure, it is desirable to provide a seat partition that can reduce deterioration of comfort in rear seats.

One aspect of the present disclosure is a seat partition that comprises a plate-shaped panel configured to be mounted to a seat having a headrest. The panel comprises: a main portion configured to cover at least a part of the headrest from a rear thereof; a side portion configured to cover at least a part of the headrest from a side thereof; a curved portion coupling the main portion and the side portion; and at least one ridge portion extending from the main portion through the curved portion to the side portion and projecting outward of the panel.

With such configuration, airflow supplied from a front of the seat can be guided rearward of the seat by means of the ridge portion extending from the main portion to the side portion. This allows providing appropriate air conditioning to the seats rearward of the seat partition, and thus reducing deterioration of comfort in the rear seats.

In one aspect of the present disclosure, the panel may comprise, as the at least one ridge portion, a first ridge portion and a second ridge portion arranged below the first ridge portion. With such configuration, the two ridge portions arranged one above the other can achieve an improved air guiding effect to the rear of the seat.

In one aspect of the present disclosure, an end of the second ridge portion in the main portion may be located at a position more distant from the side portion than an end of the first ridge portion in the main portion. An end of the second ridge portion in the side portion may be located at a position closer to the main portion than an end of the first ridge portion in the side portion. With such configuration, the first ridge portion located above extends further forward than the second ridge portion located below, and the second ridge portion located below extends further rearward than the first ridge portion located above, and thereby an improved air guiding effect to the rear of the seat can be achieved.

In one aspect of the present disclosure, the at least one ridge portion may be located upper than an up-down direction center line of the panel. With such configuration, it is less likely to cause overlap between a field of view when an occupant of the seat with the seat partition mounted looks back and the ridge portion. Thus, an improved rearward visibility for the occupant can be achieved.

BRIEF DESCRIPTION OF THE DRAWINGS

An exemplary embodiment of the present disclosure will be described hereinafter with reference to the accompanying drawings, in which.

DETAILED DESCRIPTION OF EXEMPLARY EMBODIMENTS

1. First Embodiment

[1-1. Configuration]

Figure 1:
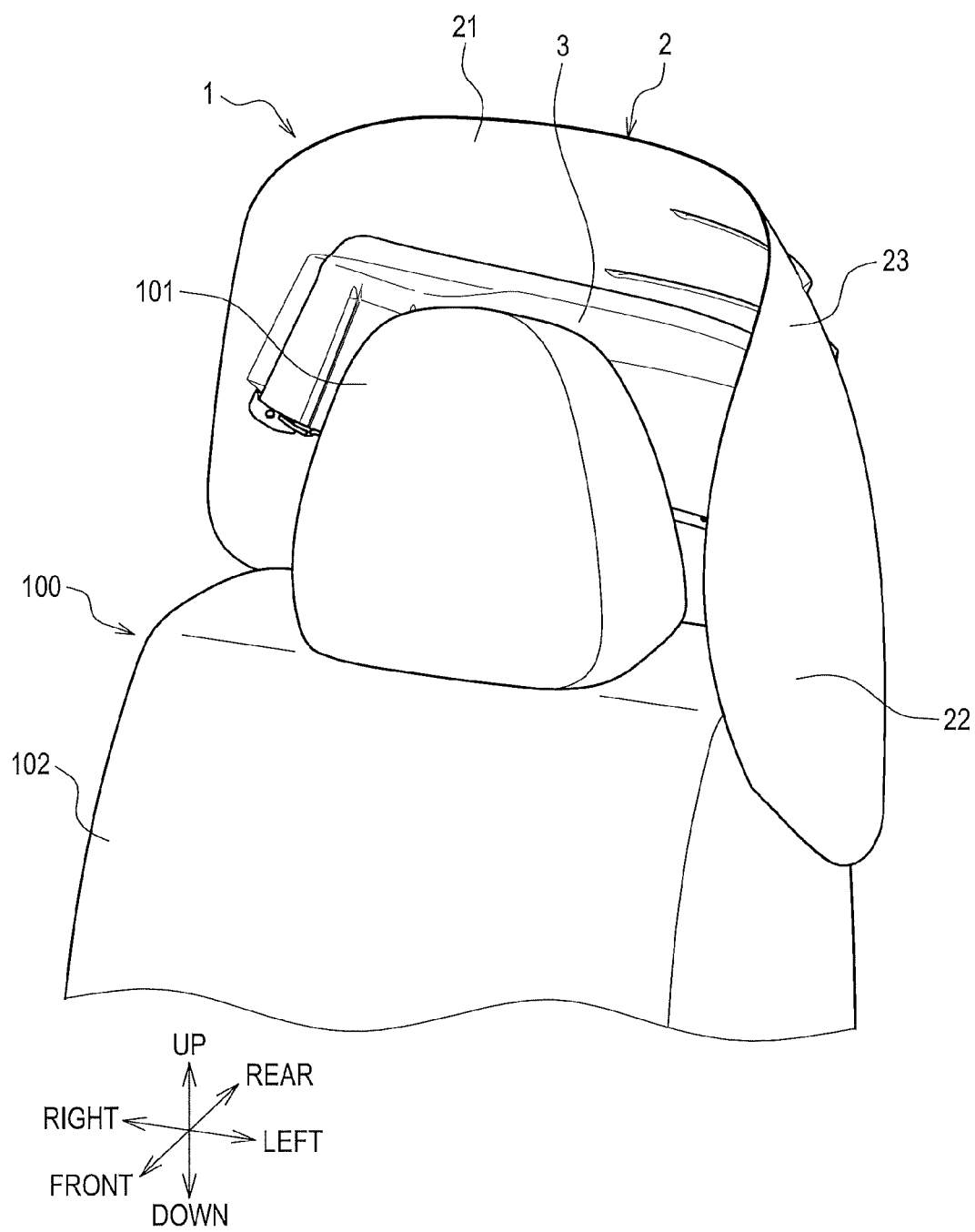
FIG. 1 is a schematic perspective view showing a state of use of a seat partition of the embodiment.

A seat partition 1 shown in FIG. 1 is configured to be mounted to a seat 100 having a headrest 101 and a seatback 102. The seat 100 is a seat of a passenger car, such as a driver's seat of a taxi.

The seat partition 1 comprises a panel 2 and a blower 3. Up, down, left, right, front, rear directions in the present disclosure mean respective directions with respect to the seat 100. Specifically, the directions in the present disclosure mean respective directions in a state where the seat partition 1 is mounted to the seat 100.

<Panel>

The panel 2 is a plate-shaped member configured to be mounted to the seat 100. The panel 2 is transparent and is configured with, for example, an acrylic plate.

Figure 2:
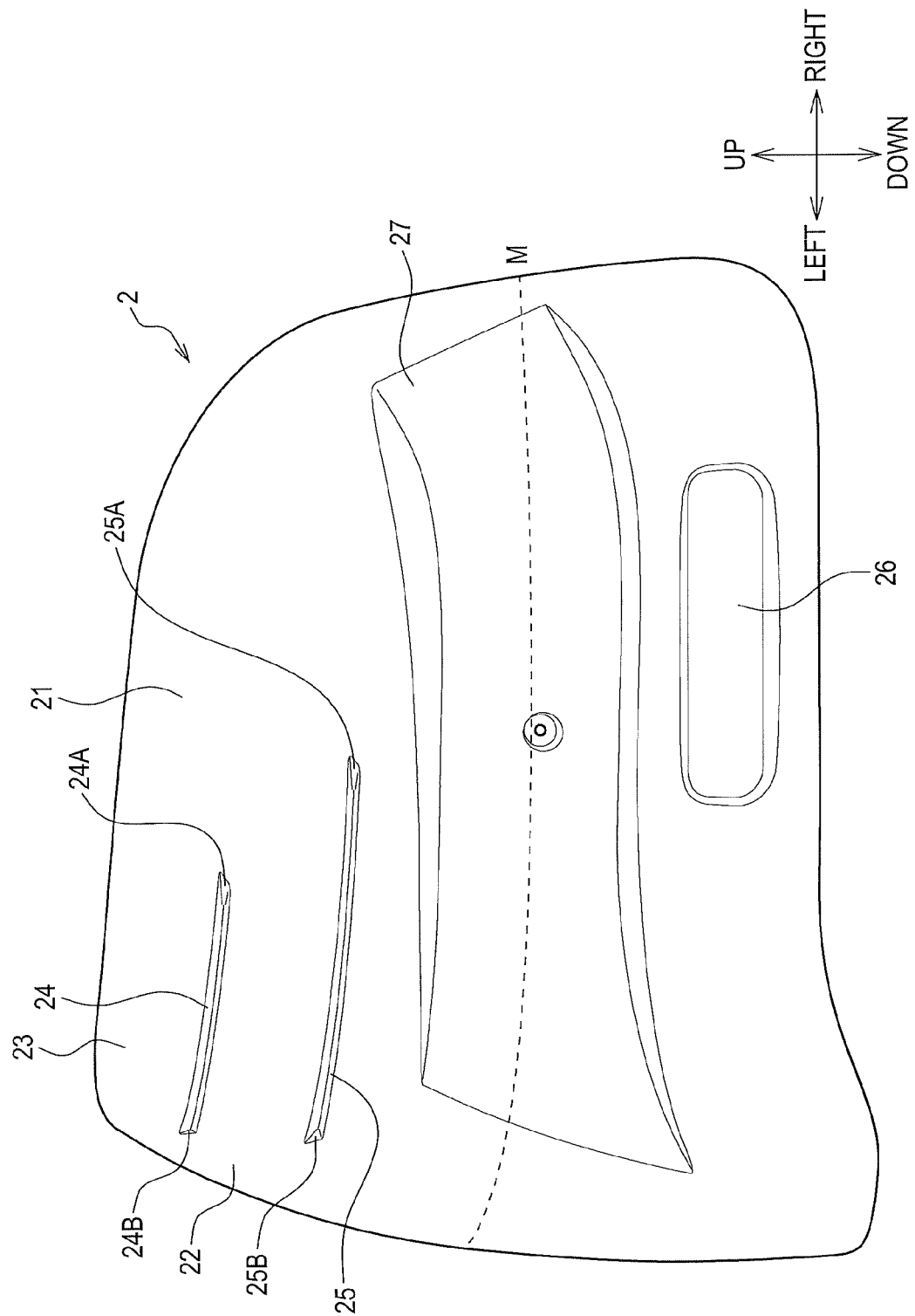
FIG. 2 is a schematic rear view of the seat partition in FIG. 1.

As shown in FIG. 2, the panel 2 comprises a main portion 21, a side portion 22, a curved portion 23, a first ridge portion 24, a second ridge portion 25, a base 26, and an air passage 27.

<Main Portion>

The main portion 21 is configured to cover at least a part of the headrest 101 from the rear. The main portion 21 is a portion forming a rear surface with which airflow from the rear of the seat 100 collides. The main portion 21 comprises an upper end portion curved forward.

The main portion 21 has a length in a left-right direction greater than a length of the headrest 101 in the left-right direction. The main portion 21 has a length in the up-down direction greater than a length of the headrest 101 in the up-down direction. The main portion 21 comprises a lower end portion covering a shoulder portion of the seatback 102 from the rear (see FIG. 1).

<Side Portion>

The side portion 22 is configured to cover at least a part of the headrest 101 from the side (specifically from the left).

The side portion 22 is arranged leftward of the main portion 21. The side portion 22 is a portion forming a side surface with which airflow from the left of the seat 100 collides. The side portion 22 comprises an upper end portion curved rightward.

The side portion 22 has a length in a front-rear direction greater than a length of the headrest 101 in the front-rear direction. The side portion 22 has a length in the up-down direction greater than a length of the headrest 101 in the up-down direction. The side portion 22 comprises a lower end portion covering the shoulder portion of the seatback 102 from the left (see FIG. 1).

<Curved Portion>

Figure 3:
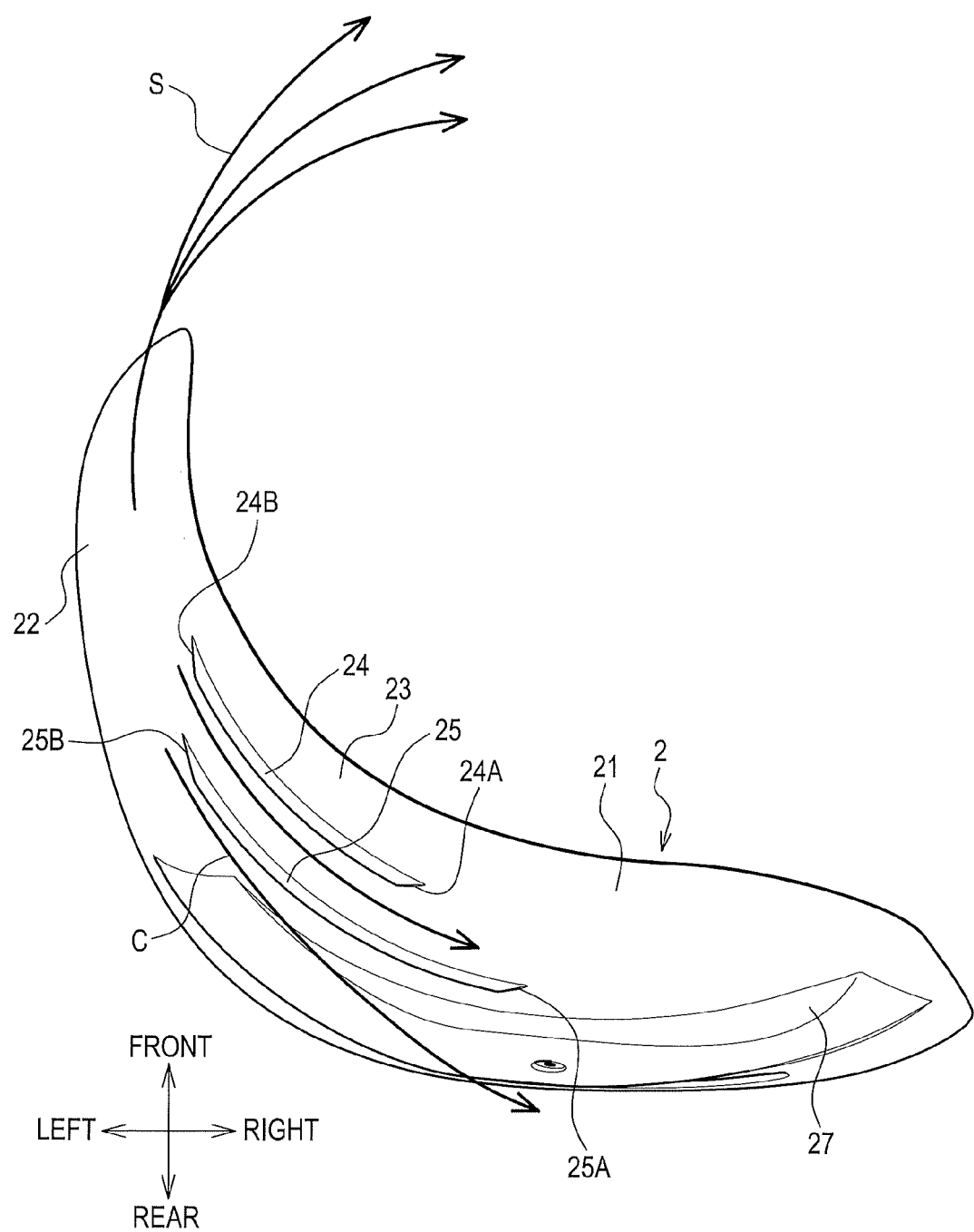
FIG. 3 is a schematic plan view of the seat partition in FIG. 2.

The curved portion 23 couples the main portion 21 and the side portion 22. The curved portion 23 is coupled to a left end of the main portion 21 and to a rear end of the side portion 22. As shown in FIG. 3, the curved portion 23 has a C-shaped curve that is convex left rearward when viewed from above.

As shown in FIG. 2, an upper end portion of the curved portion 23 is flush with the upper end portion of the main portion 21 and with the upper end portion of the side portion 22, and is curved right forward. A lower end portion of the curved portion 23 is flush with the lower end portion of the main portion 21 and the lower end portion of the side portion 22, and covers the shoulder portion of the seatback 102 from the left rear.

<Ridge Portion>

The first ridge portion 24 extends from the main portion 21 through the curved portion 23 to the side portion 22, and projects outward of the panel 2 (i.e., opposite to the headrest 101). The first ridge portion 24 is a bead curved in a C-shape that is convex left rearward along the curved portion 23 when viewed from above.

A first rear end 24A of the first ridge portion 24 is located in the main portion 21. A first front end 24B of the first ridge portion 24 is located in the side portion 22. The first front end 24B is located upper than the first rear end 24A.

The first ridge portion 24 has a constant projection amount and a constant width along a longitudinal direction of the first ridge portion 24 except at the first rear end 24A and the first front end 24B. The first ridge portion 24 has a triangle-shaped cross section orthogonal to the longitudinal direction.

The second ridge portion 25 extends from the main portion 21 through the curved portion 23 to the side portion 22, and projects outward of the panel 2, similarly to the first ridge portion 24. The second ridge portion 25 is a bead curved in a C-shape that is convex left rearward along the curved portion 23 when viewed from above.

A second rear end 25A of the second ridge portion 25 is located in the main portion 21. A second front end 25B of the second ridge portion 25 is located in the side portion 22. The second front end 25B is located upper than the second rear end 25A.

The second ridge portion 25 has a constant projection amount and a constant width along a longitudinal direction of the second ridge portion 25 except at the second rear end 25A and the second front end 25B. The second ridge portion 25 has a triangle-shaped cross section orthogonal to the longitudinal direction.

The second ridge portion 25 is arranged lower than the first ridge portion 24 and upper than the air passage 27. Also, the second ridge portion 25 has a length along its longitudinal direction greater than a length of the first ridge portion 24 along its longitudinal direction.

The second rear end 25A of the second ridge portion 25 is located at a position more distant from the side portion 22 (i.e., further rightward) than the first rear end 24A of the first ridge portion 24. Also, the second front end 25B of the second ridge portion 25 is located at a position closer to the main portion 21 (i.e., further rearward) than the first front end 24B of the first ridge portion 24.

Air C supplied from the front of the seat 100 by an air conditioning device of the passenger car flows to go around to a rear of the panel 2 by means of the first ridge portion 24 and the second ridge portion 25. As a result, the air C by air conditioning is supplied to the rear of the panel 2.

Both the first ridge portion 24 and the second ridge portion 25 are located upper than an up-down direction center line M of the panel 2. Also, the first ridge portion 24 and the second ridge portion 25 each are located upper than the headrest 101 in a state where the panel 2 is fixed to the headrest 101.

An area of the panel 2 located between the first ridge portion 24 and the second ridge portion 25 in the up-down direction has a constant up-down width along the longitudinal direction of the first ridge portion 24. In other words, in the area of the panel 2 where the first ridge portion 24 and the second ridge portion 25 face each other in the up-down direction, a distance (i.e., a space) between the first ridge portion 24 and the second ridge portion 25 is constant along the longitudinal direction of the first ridge portion 24.

<Base>

The base 26 is a portion to which a fixation device (not shown) for fixing the panel 2 to the headrest 101 is to be mounted.

The base 26 is arranged in an area of the main portion 21 below the air passage 27. The base 26 protrudes inward of the panel 2 (i.e., toward the headrest 101). The fixation device is secured to the base 26, for example, with bolts and nuts.

<Air Passage>

The air passage 27 is a portion to which the blower 3 is mounted, and which guides a wind generated by the blower 3.

The air passage 27 is arranged in an area below the second ridge portion 25 in the main portion 21 and the curved portion 23. The air passage 27 protrudes outward of the panel 2 (i.e., opposite to the headrest 101). The blower 3 is secured to the air passage 27, for example, with bolts and nuts.

<Blower>

Figure 4:
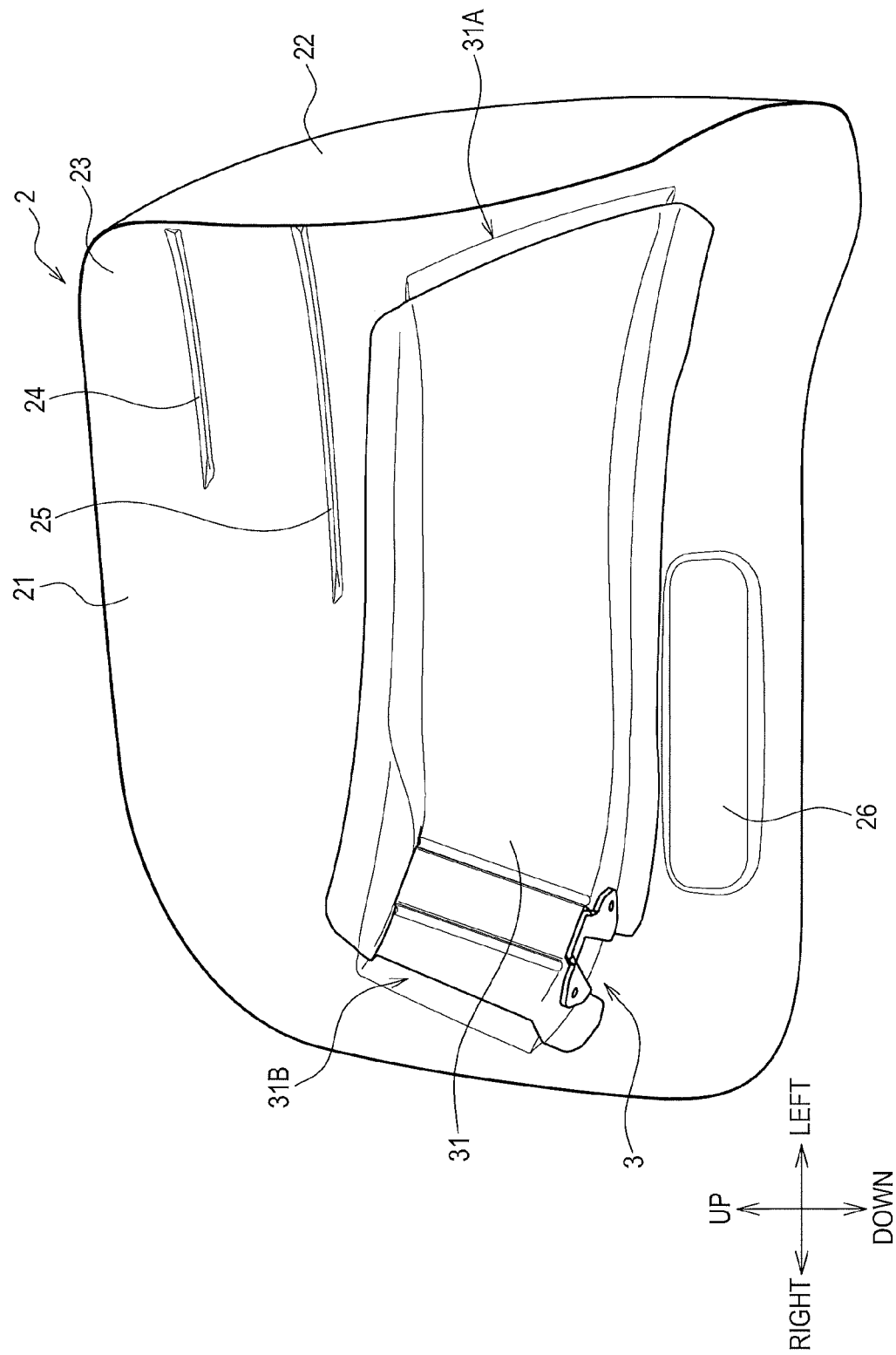
FIG. 4 is a schematic front view of the seat partition in FIG. 2.

As shown in FIG. 4, the blower 3 is mounted to an inner surface (specifically, a surface facing the headrest 101) of the panel 2.

The blower 3 is arranged to overlap the air passage 27 so as to extend over the main portion 21 and the curved portion 23. The blower 3 comprises a cover 31 that comprises a suction port 31A and a discharge port 31B, and a fan (not shown) arranged inside the cover 31.

The blower 3 suctions air from the suction port 31A by means of the fan, and discharges the air from the discharge port 31B. As shown in FIG. 3, the air discharged from the blower 3 forms an air shield S flowing right forward along the curve of the panel 2. The air shield S is formed so as to surround the head of an occupant of the seat 100.

[1-2. Effects]

According to the embodiment detailed above, the following effects can be obtained.

(1a) Airflow supplied from the front of the seat 100 can be guided to the rear of the seat 100 by means of the first ridge portion 24 and the second ridge portion 25 extending from the main portion 21 to the side portion 22. This allows providing appropriate air conditioning to seats rearward of the seat partition 1, and thus reducing deterioration of comfort in the rear seats.

(1b) The two ridge portions 24, 25 arranged one above the other can achieve an improved air guiding effect to the rear of the seat 100.

(1c) The first ridge portion 24 located above extends further forward than the second ridge portion 25 located below, and the second ridge portion 25 located below extends further rearward than the first ridge portion 24 located above. This can achieve an improved air guiding effect to the rear of the seat 100.

(1d) The configuration, in which the first ridge portion 24 and the second ridge portion 25 are located upper than the up-down direction center line M of the panel 2, is less likely to cause overlap between a field of view when the occupant of the seat 100 with the seat partition 1 mounted looks back, and the first ridge portion 24 and the second ridge portion 25. Thus, an improved rearward visibility for the occupant can be achieved.

[2. Other Embodiments]

Although one embodiment of the present disclosure has been described above, it is to be understood that the present disclosure is not limited to the above-described embodiment, but may be implemented in various forms.

(2a) In the seat partition of the above-described embodiment, the side portion and the curved portion may be provided on a right side of the main portion. In other words, the seat partition may be laterally symmetrical in shape to the seat partition of the above-described embodiment.

(2b) In the seat partition of the above-described embodiment, a positional relationship between the first ridge portion and the second ridge portion is not limited to the above-described. For example, a front end of the first ridge portion and a front end of the second ridge portion may be located at aligned positions along the up-down direction. Also, the first ridge portion and the second ridge portion need not necessarily be arranged upper than the up-down direction center line of the panel.

(2c) In the seat partition of the above-described embodiment, the panel need not necessarily comprise two ridge portions. The panel may have a single ridge portion, or may have three or more ridge portions.

(2d) The seat partition of the above-described embodiment may be applied to seats to be used for cars other than passenger cars, or seats to be used for vehicles other than cars, such as railroad vehicles, ships and boats, and aircrafts.

(2e) A function served by a single element in the aforementioned embodiments may be achieved by a plurality of elements, or a plurality of functions served by a plurality of elements may be achieved by a single element. Also, a part of a configuration in any of the aforementioned embodiments may be omitted. Further, at least a part of a configuration in any of the aforementioned embodiments may be added to, or replace, a configuration in another of the aforementioned embodiments. It is to be noted that any form included in the technical idea defined by the language of the appended claims may be an embodiment of the present disclosure.

What is claimed is:

1. A seat partition comprising:
a plate-shaped panel configured to be mounted to a seat having a headrest, the panel comprising:
a main portion configured to cover at least a part of the headrest from a rear thereof;
a side portion configured to cover at least a part of the headrest from a side thereof;
a curved portion coupling the main portion and the side portion;
a first ridge portion extending from the main portion through the curved portion to the side portion; and
a second ridge portion arranged below the first ridge portion and extending from the main portion through the curved portion to the side portion,
wherein the first ridge portion and the second ridge portion project rearward from the panel and are configured to guide air flow from a front side of the seat to a rear side of the seat,
wherein an end of the second ridge portion in the main portion is located at a position more distant from the side portion than an end of the first ridge portion in the main portion, and
wherein an end of the second ridge portion in the side portion is located at a position closer to the main portion than an end of the first ridge portion in the side portion.

2. The seat partition according to claim 1,
wherein the first ridge portion and the second ridge portion are both located at a position above an up-down direction center line of the panel.

3. The seat partition according to claim 1,
wherein the first ridge portion and the second ridge portion each include a front edge that is located in the side portion of the panel, each front edge being configured to guide air flow from the side portion of the panel towards the main portion of the panel.

4. The seat partition according to claim 1,
wherein the panel is transparent.

5. The seat partition according to claim 1,
wherein the first ridge portion has a triangle-shaped cross section orthogonal to a longitudinal direction of the first ridge portion, and
wherein the second ridge portion has a triangle-shaped cross section orthogonal to a longitudinal direction of the second ridge portion.

6. The seat partition according to claim 1,
wherein the second ridge portion has a length along a longitudinal direction of the second ridge portion that is greater than a length of the first ridge portion along a longitudinal direction of the first ridge portion.

7. A seat partition comprising:
a plate-shaped panel configured to be mounted to a seat having a headrest, the panel comprising:
a main portion configured to cover at least a part of the headrest from a rear thereof;
a side portion configured to cover at least a part of the headrest from a side thereof;
a curved portion coupling the main portion and the side portion;
a first ridge portion extending from the main portion through the curved portion to the side portion; and
a second ridge portion arranged below the first ridge portion and extending from the main portion through the curved portion to the side portion,
wherein the first ridge portion and the second ridge portion project rearward from the panel and are configured to guide air flow from a front side of the seat to a rear side of the seat,
wherein, between a first front end and a first rear end, the first ridge portion has a constant projection amount and a constant width along a longitudinal direction of the first ridge portion, and
wherein, between a second front end and a second rear end, the second ridge portion has a constant projection amount and a constant width along a longitudinal direction of the second ridge portion.

8. The seat partition according to claim 7,
wherein the first front end of the first ridge portion is located in the side portion of the panel and the first rear end of the first ridge portion is located in the main portion of the panel, and wherein the second front end the second ridge portion is located in the side portion of the panel and the second rear end of the second ridge portion is located in the main portion of the panel.

* * * * *